(No Model.)
F. H. WRIGHT.
LOCKING DEVICE FOR BICYCLES.
No. 603,780. Patented May 10, 1898.
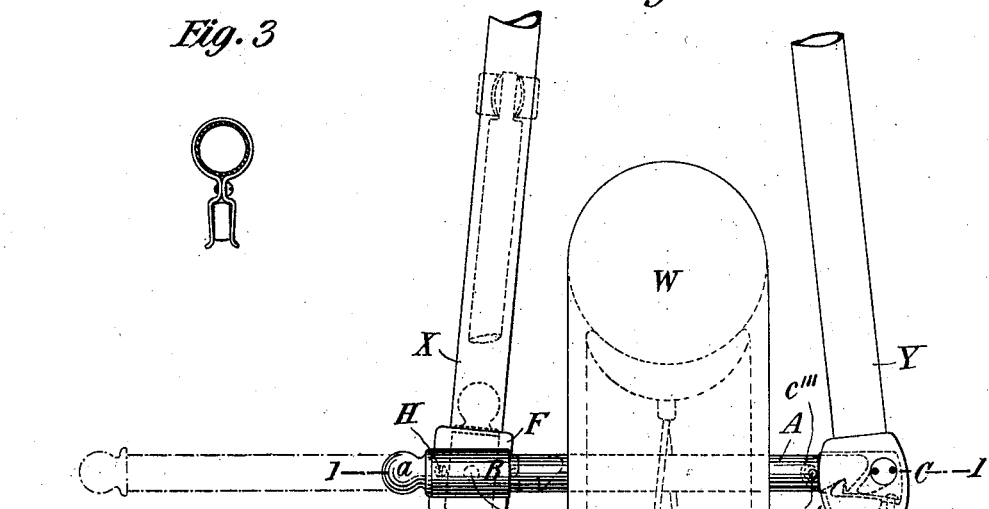
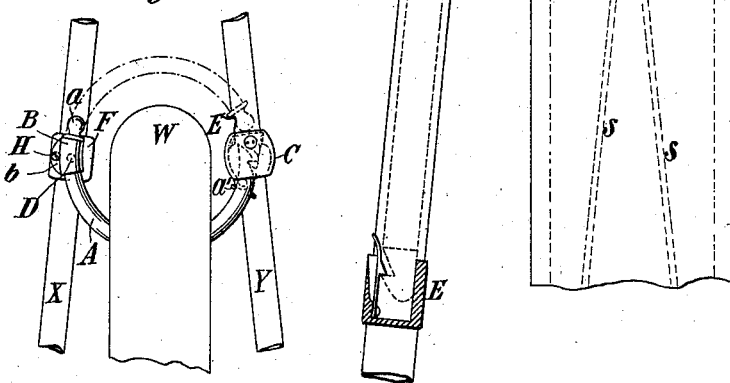
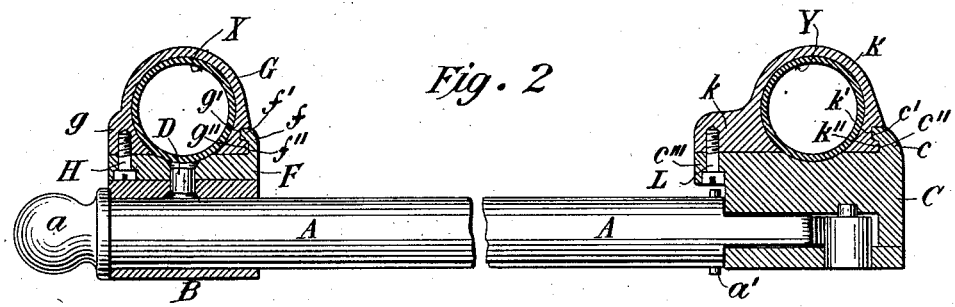
Witnesses: Raphael Netter, James N. Catlow.
Francis H. Wright Inventor
by Frederick S. Duncan Att'y

UNITED STATES PATENT OFFICE.

FRANCIS H. WRIGHT, OF NEW YORK, N. Y.

LOCKING DEVICE FOR BICYCLES.

SPECIFICATION forming part of Letters Patent No. 603,780, dated May 10, 1898.

Application filed November 9, 1896. Serial No. 611,465. (No model.)

*To all whom it may concern:*

Be it known that I, FRANCIS H. WRIGHT, a citizen of the United States, residing at New York city, in the county of New York and State of New York, have invented a new and useful Improvement in Locking Devices for Bicycles and Similar Vehicles, of which the following is a full and exact specification, reference being had to the drawings accompanying and forming a part of the same.

My invention relates generally to devices for locking bicycles and similar vehicles; and it consists in the improvements in the construction and arrangement or combination of parts hereinafter described in the specification and shown in the accompanying drawings.

I am aware that heretofore bicycle-locks have been made and patented in which the use of pivoted or hinged lock-bars is shown; but these locks, however, differ essentially from my device and do not accomplish the objects for which it is intended.

Among the objects of my invention are the following: to provide a lock-bar which may be readily inserted between the spokes of the wheel even when the spokes are crossed and which may be used on bicycles or vehicles of varying distances between the parts of the frame on the opposite sides of the wheel to be locked and to provide a locking device which when in the locked position locks not only the wheel, but also locks the devices by which the main device is attached to the two parts of the frame on opposite sides of the wheel, so that the device cannot be removed from the frame, and which when in the unlocked position frees not only the wheel, but also the attaching devices, so that said device may be quickly and easily removed from the frame, the former locks showing the parts either so attached to the frame that they can be easily removed even when the wheel is locked or riveted to the frame, so that they cannot be removed without the assistance of a mechanic.

Figure 1 is a view in elevation of a part of the frame of a bicycle with my invention attached thereto, showing my device both in the locked and in the unlocked position. Fig. 2 is a view in section along the line 1 1 in Fig. 1. Fig. 3 is a view in section of a device for holding the end of the lock-bar when it is not in use. Fig. 4 is a view in elevation of a modification of my invention in which a curved lock-bar is used, showing the same attached to part of the frame of a bicycle.

Similar letters refer to similar parts throughout the several views.

A is a lock-bar, B is a hollow sleeve, and C is a lock-box containing any suitable devices for engaging and holding the end of a lock-bar A when inserted therein, so that the same cannot be withdrawn until released from the locking devices by means of a key or other equivalent device, including a combination-lock or any other device by means of which the lock is controlled only by the person having the key or combination.

The details of the construction of the locking devices in the lock-box constitute no part of my invention so long as the locking devices are of the above nature and will accomplish the aforesaid results. The sleeve B is free to turn upon a pivot D and is securely attached to the frame of a vehicle by suitable means. The lock-box C is also securely attached to the frame of a vehicle on the opposite side of the wheel by suitable means. The lock-bar A passes through the hollow sleeve B and may be pushed through the sleeve, so that one end of the bar engages with the locking devices in the lock-box C, or may be retracted, so that the end of the bar is clear of the spokes of the wheel; but one end of said lock-bar is enlarged, as shown at $a$, so that said end will not pass through the sleeve. Near the other end of the lock-bar may be placed a projecting pin or rim $a'$, which will prevent that end also from being drawn through the sleeve.

When in the locked position, the bar A extends through the sleeve B, through the wheel, and between the spokes thereof and into the lock-box C, where the end of the bar engages with and is held by the locking devices. To unlock the wheel, the end of the bar is first released from the locking devices and the bar is withdrawn from the lock-box C and is pulled through the sleeve B until the end of the bar clears the spokes of the wheel. The bar and the sleeve are then rotated on the pivot D. The bar is pushed through the sleeve, and the end thereof is inserted in a box or pocket E, attached to the frame of the vehicle, in order to prevent the bar from interfering with the operation of the wheel. The box E may contain a spring device in order more securely to hold the end of the bar. One form of spring device is shown in Fig. 1; but any other suitable form may be used, the detail of construction of such device constituting no part of my invention. Any other suitable device to be attached to the frame of the vehicle for holding either end of the bar when the same is in unlocked position may be employed. Fig. 3 shows one device that may be used, which consists in a spring-collar clasping the frame, with the ends held together by a screw, the ends projecting, however, beyond the screw to form a pair of horns, into which either end of the bar may be pushed and held securely by the pressure of the horns against the bar. The dotted lines on Fig. 1 show the lock-bar when in the unlocked position. The lock-bar may be either straight or curved, as shown in Fig. 4. When a curved bar is used, the sleeve B is curved and the box E or other device for holding the end of the bar when it is not in use is attached to the lock-box C or to the frame near the lock-box C.

W is the rim of the wheel, S S the spokes, and X and Y are portions of the frame on opposite sides of the wheel, respectively.

In the form of my device that I prefer to use the sleeve is attached to the frame by means of the pivot, the base F, and the spring-collar G.

G is a spring-collar which may be slipped around the frame of the vehicle, nearly encircling the same. One end of the collar is slightly enlarged, as shown at $g$, and the outer surface of the other end of the collar is provided with a groove $g'$ and a tongue $g''$.

F is a base upon the flat surface of which the sleeve B rests and turns. The opposite surface of the base F rests upon the ends of the collar G and upon that portion of the frame which is not encircled by the collar. On one end of the base F there is a projection $f$, a tongue $f'$, and a groove $f''$, which, in connection with the groove $g'$ and tongue $g''$, form a double tongue-and-groove joint.

H is a screw or screws passing through the base F into the end $g$ of the collar.

When the collar G is placed around the frame and the base F is put in position, the tongue and groove $f'$ and $f''$ fitting into the groove and tongue $g'$ and $g''$, respectively, and the screw H is passed through the base F and into the end of the collar $g$ and is tightened, the collar and base will be caused securely to clasp the frame, so that they cannot be moved thereon or removed therefrom without loosening or removing the screw. The sleeve is attached to the base by means of the pivot D, which passes through one wall of the hollow sleeve and through the base F, the ends of the pivot being broadened, so as to form a rivet, and being held in grooves countersunk in the interior surface of the sleeve and in the surface of the base, so as not to project beyond the surface-lines of those parts.

It is evident that the pivot and the base may be made in one part and the sleeve turn upon the pivot, or that the sleeve and pivot may be made in one part and turn together in the base F, without essentially changing the construction or relative functions of these parts. The length of the sleeve B and the width of the base F are the same, so that when the bar is in the locked position the sleeve will cover the head of the screw H. The width of the sleeve is less than that of the base, so that when the bar is in the unlocked position the head of the screw will be exposed. Thus when the lock-bar is in the locked position not only is the wheel locked, but the devices for attaching the sleeve to the frame are also locked and covered, so that they cannot be removed from the frame; but when the lock-bar is in the unlocked position the wheel is unlocked and the attaching devices are also open, so that the sleeve and lock-bar may be quickly and readily removed from the frame. Where a curved lock-bar is used, as shown in Fig. 4, one side of the curved sleeve B projects so as to cover the head of the screw H when the bar is in the locked position. The other side of the sleeve does not project, so that when the sleeve is rotated on the pivot the head of the screw will be exposed.

In the form of my device that I prefer to use the lock-box C is attached to the frame by means of the spring-collar K, which may be slipped around the frame of the vehicle, nearly encircling the same. One end of the collar K is slightly enlarged, as shown at $k$, and the outer surface of the other end contains a groove $k'$ and tongue $k''$. At one end of the surface of the lock-box C there is a projection $c$, a tongue $c'$, and groove $c''$. The tongue and groove $c'$ and $c''$, together with the tongue and groove $k'$ and $k''$, form a double tongue-and-groove joint. The other end of the lock-box C projects beyond the opening into which the end of the lock-bar passes, so as to form a shoulder $c'''$. One or more screws L pass through the shoulder $c'''$ into the enlarged end $k$ of the collar K. When the collar K has been placed around the frame and the lock-box C is put into position, the tongue and groove $c'$ and $c''$, fitting into the groove and tongue $k''$ and $k'$, respectively, and the screw L is tightened, the lock-box and collar will be caused securely to clasp the frame, so that they cannot be moved thereon or removed therefrom without loosening or removing the screw. When the lock-bar is in the locked position, it will cover the head of the screw L, and when the lock-bar is in the unlocked position the head of the screw will be exposed. Thus when the lock-bar is in the locked position not only is the wheel locked, but also the devices attaching the lock-bar to the frame; but when the lock-bar is in the unlocked position the wheel is unlocked and also the attaching devices, so that the lock-box can be quickly and readily removed from the frame.

Having thus described my invention, what I claim is—

1. In a device for locking the wheels of bicycles or other vehicles, the combination of a lock-bar as A, a pivoted sleeve, as B, open at both ends, through which the bar passes and projects and is free to be drawn backward and forward from either end, secured at one side of the wheel, and a lock-box, as C, secured at the opposite side of the wheel, containing locking devices which are adapted to engage the end of the lock-bar when inserted in the box and hold the same so that it cannot be withdrawn until released from the locking devices by means of a key or other equivalent device as above described, substantially as set forth and described.

2. In a device for locking the wheels of bicycles and other vehicles, the combination of a lock-bar as A, a pivoted sleeve, as B, open at both ends, through which the bar passes and projects and is free to be drawn backward and forward from either end, a lock-box, as C, containing locking devices which are adapted to engage the end of the lock-bar when inserted in the box and hold the same so that it cannot be withdrawn until released from the locking devices by means of a key or other equivalent device as above described, and means for attaching the sleeve and the lock-box respectively to the frame or other parts of the bicycle or vehicle, substantially as set forth.

3. Means for attaching the sleeve to the frame or other part of the bicycle or vehicle; consisting in the combination of a base to which the sleeve is secured by means of a pivot passing through the wall of the sleeve and a spring-collar partially encircling the frame or other part of the bicycle or vehicle and secured to the base by a tongue-and-groove joint and by a screw or screws passing through the base into the collar, arranged and adapted so that the hollow sleeve which is pivoted to the base and through which the lock-bar passes will cover the head of the screw whenever the lock-bar is in the locked position and will uncover the head of the screw when the lock-bar is in the unlocked position, substantially in the manner and for the purposes above described and set forth.

4. Means for attaching the lock-box to the frame or other part of the bicycle or vehicle; consisting in the combination of a lock-box with a projecting shoulder, and a spring-collar partially encircling the frame and secured to the lock-box by a tongue-and-groove joint and by a screw or screws passing through the shoulder of the lock-box into the collar, arranged and adapted so that the lock-bar when in the locked position will cover the head of the screw and when in the unlocked position, will uncover the head of the screw, substantially in the manner and for the purposes above described and set forth.

5. In a device for locking the wheels of bicycles and other similar vehicles, the combination of a lock-bar, a pivoted sleeve open at both ends through which the bar passes and projects and is free to be drawn backward and forward from either end, secured at one side of the wheel, a lock-box, secured at the opposite side of the wheel, containing locking devices which are adapted to engage the end of a lock-bar when inserted in the box and hold the same so that it cannot be withdrawn until released from the locking devices by means of a key or other equivalent device as above described, and the above-described means for attaching the sleeve and the lock-box respectively to the frame, adapted and operating to cover and lock the devices by which the sleeve and lock-box respectively are attached to the frame so that they cannot be removed from the frame whenever the lock-bar is in the locked position, and to expose the attaching devices so that they can be removed from the frame whenever the lock-bar is in the unlocked position, substantially in the manner and for the purposes above described and set forth.

FRANCIS H. WRIGHT.

Witnesses:
THEODORE A. WRIGHT,
PAUL VALLENDER.